Jan. 11, 1949. S. COUPER 2,458,682
ROLLER BEARING CHAIN
Filed Aug. 1, 1947
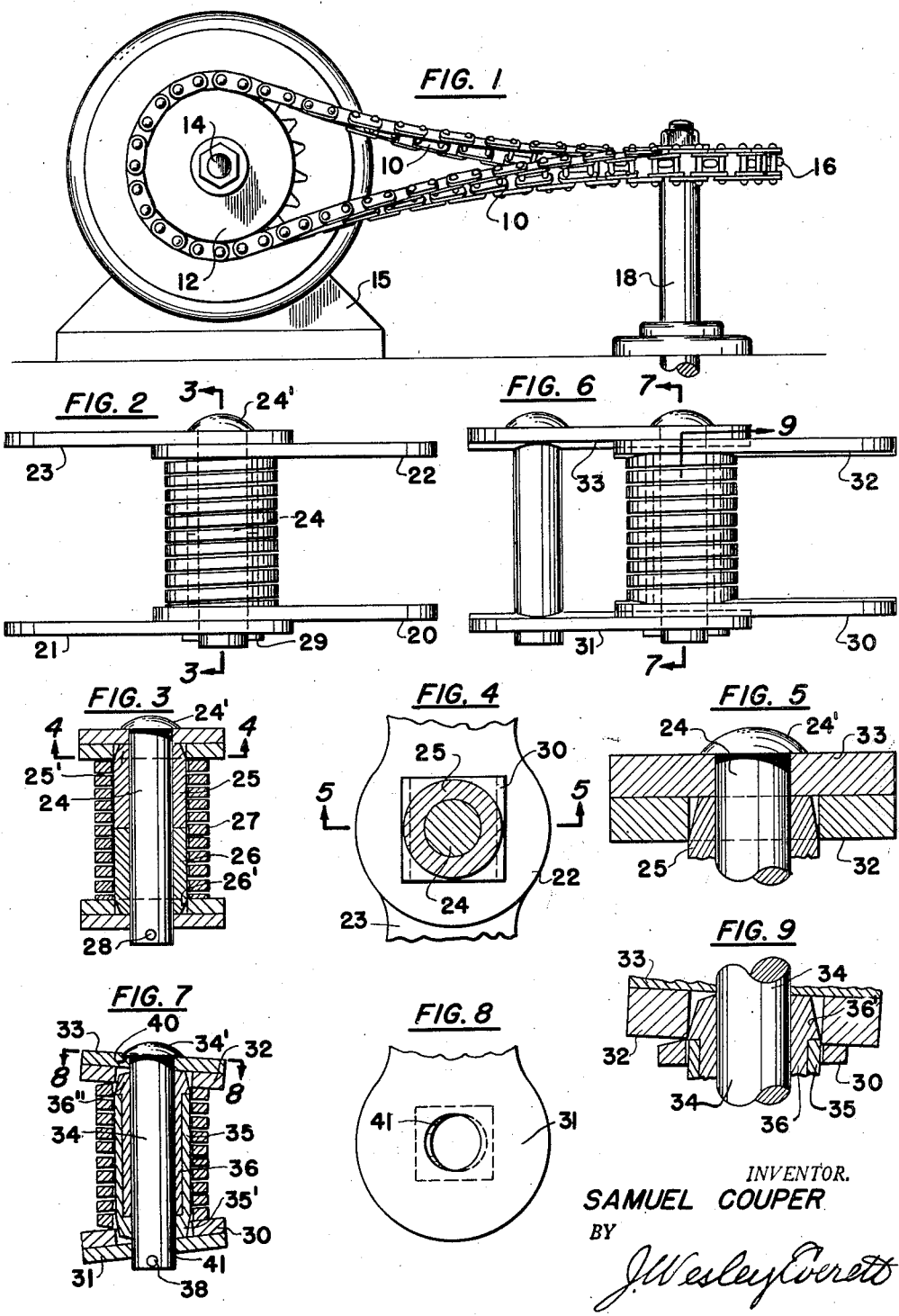
INVENTOR.
SAMUEL COUPER
BY
J. Wesley Everett Patented Jan. 11, 1949

2,458,682

UNITED STATES PATENT OFFICE 2,458,682

ROLLER BEARING CHAIN

Samuel Couper, Baltimore, Md.

Application August 1, 1947, Serial No. 765,327

5 Claims. (Cl. 74—245)

The present invention relates to a roller drive chain and especially to a drive chain having certain novel features which will enable its efficient operation upon sprockets not being rotated in the same plane.

In the past it has been necessary to have the sprockets over which the chain operates in substantially the same plane, as the conventional chain is so constructed that it resists any side or twisting action. In order to operate two or more shafts whose axis did not run parallel, it was necessary to use a belt drive, or some type of gearing mechanism. However, there are many instances in which a direct chain drive would be more efficient and more economical, if it were possible to drive a sprocket which is not directly in the same plane with the driving sprocket and it is with this feature in mind that the present improvement has been developed.

The primary object of the invention is to provide a drive chain which is constructed to take a definite and limited amount of twist.

Another object being to resiliently support the side link connecting members against such twisting action.

Still another object being to provide a novel construction for increasing the bearing surface of the side links upon their supporting elements.

While several principal objects of the invention have been pointed out other objects and advantages will be more apparent as the nature of the invention is better understood in which the novel construction will be clearly described in the detailed description and illustrated in the single sheet of drawings, in which:

Figure 1 is a view in elevation of a pair of sprockets operating at right angles to each other and connected by a single length of the improved drive chain.

Figure 2 is an enlarged top plan view of a section of the chain.

Figure 3 is a sectional view taken along line 3—3 of Figure 2.

Figure 4 is an enlarged fragmentary sectional view taken along the line 4—4 of Figure 3.

Figure 5 is a fragmentary sectional view taken along the line 5—5 of Figure 4.

Figure 6 is a top plan view of a modified form of link similar to the view of Figure 2.

Figure 7 is a sectional view taken along the line 7—7 of Figure 6.

Figure 8 is an enlarged fragmentary side view of the outside plate member taken along the line 8—8 of Figure 7.

Figure 9 is an enlarged fragmentary sectional view taken along the line 9—9 of Figure 6.

Referring to the drawings where like numerals designate like parts throughout the several views, the general application of the chain 10 is shown in Figure 1. For purposes of illustration, one end of an endless chain 10 is looped over a driving sprocket 12, which is mounted upon the shaft 14, the shaft and sprocket being driven by an electric motor, or other conventional power unit 15. The opposite end of the chain is looped over a sprocket 16, which is mounted on a shaft 18 and for illustration, is shown as operating in a plane perpendicular to the shaft 14. However, the shafts may be operated at angles other than the one shown and in fact a single chain may be operating over several sprockets in which the several shafts may be rotated at various angles to each other.

Referring more in detail to the preferred form of the chain link structure as illustrated in Figures 1 to 5, the link is composed of side connecting link members 20, 21, 22 and 23, a pair of sleeve members 25 and 26, an elastic or spring roller bearing member 27 and a connecting pin 24 for holding these members in their proper place upon the assembly of the link.

The inner link members 20 and 22 are provided preferably with a slightly rectangular aperture 30 which is of such dimensions as to be receivable over rectangular shoulders 25' and 26' formed on the outer end of the sleeves or bushings 25 and 26. However, these rectangular apertures may take any other similar form in which two of the sides run parallel with the longitudinal axes of the side plate member. The outer side or plate members 21 and 23 are of the conventional type with round, or circular apertures, which are hingably mounted on a pin, or link connecting member 24. The elastic spring roller member 27 is made slightly longer than the width of the chain between the inner side members in order to exert a slight pressure against the inner surface of the links 20 and 22. The pin 24 is provided with a head 24' and an aperture 28 for inserting a cotter pin 29. However, both ends of the pin may be provided with a head similar to 24'.

The side surfaces of shoulders 25' and 26' on which the sides of the aperture running parallel with the longitudinal axis of the side plate rest are slightly tapered toward the ends of the sleeve, as shown in Figures 3 and 4. The opposite sides of the shoulder do not carry a taper. These sides being in the direction of the pull on the chain and are designed to give a maximum amount of bearing surface between the inner side members and the sleeve.

The tapered sides of the shoulders give a limited amount of twisting motion between these elements, which is cushioned by the spring roller bearing.

The sleeve members 25 and 26 are of substantially the same length. They are each provided with longitudinal apertures of such dimensions as to slidably receive the pin 24. The two sleeve members when placed end to end are of such length as to extend over the pin through apertures 30 of the inner plate members.

The sleeve may take a different form, as shown in Figure 7, there the sleeve members 25 and 36 are constructed to telescope one another and each sleeve extending substantially the full length of the distance between the inner side members. These telescoping sleeves are likewise provided with shoulders 35' and 36' for receiving the apertures of the inner link members.

A modified form of link is shown in Figures 6 to 9. In this form the chain has the same general structure as the form just described comprising side links 30, 31, 32 and 35, a pivot pin 34, a pair of telescoping sleeves 35 and 36, and a resilient roller bearing. The outer ends or shoulders of the sleeves have the same type of rectangular tapered bearing surfaces 35' and 36' as the sleeves 25' and 26'. The pin 34 is also provided with a head 24' and an aperture 38 to receive a cotter pin for securing the pin in position. In this form, the outer plates 31 and 33 are provided with circular apertures 30 and 41 which are bored at a slight angle to the plane of the side members and are adapted to give to the chain a slight cross sectional taper, which is shown best in Figure 7. The side of the chain having the greatest width is adapted to run adjacent the sprocket. This form is particularly advantageous where the distance between the sprockets is unusually close and the angles of the two shafts are extremely great.

In operation the spring roller bearing member keeps the inner link members pressed outwardly against the outer link members. The roller bearing members being composed of a comparatively tightly wound spring, preferably of square or rectangular stock is so constructed as to exert just enough pressure to prevent the side link members from canting. The unusual twisting action of the chain is made possible primarily by the shape of the aperture within the inner side members and the separate sleeves for engaging each of the inner side members. As the outer side members are comparatively narrow they too are capable of a limited amount of twisting action on the pin, which would not be possible if both the inner and outer side members were provided with the customary round apertures together with a solid sleeve abutting against the inner side of the inner side member and a solid roller bearing. While this twisting action is very small in each link, a considerable amount is obtainable throughout the length of a normal drive chain.

Under the present construction, a drive chain running between sprockets of approximately 6 inches in diameter, or less, a right angle drive may be effected within a distance of approximately eighteen inches between centers of the shafts.

It is to be understood that the invention is not to be limited to the exact arrangement of parts as shown in the drawing and described in the specifications as various changes may be resorted to without departing from the spirit of the invention. Only in so far as the invention has been pointed out in the accompanying claims is the same to be limited.

I claim:

1. A roller bearing drive chain having a plurality of connected link members comprising individual link members having inner and outer side connecting members, the inner side members being provided adjacent their ends with apertures having at least two straight sides running parallel within the longitudinal axes of the said inner side members, the outer side members having apertures in each end thereof, a pin adapted to extend through one of the apertures in each of the inner and outer side members, a pair of sleeves, slidably receivable over the said pin, said sleeves having a shoulder formed on the outer ends thereof for engaging the straight sided apertures in the said inner side members, and a roller slidably receivable over the said sleeves and extending between the inner side members.

2. A roller bearing drive chain having a plurality of connected link members comprising individual link members having inner and outer side connecting members, the inner side connecting members being provided with apertures in each end thereof, the said apertures having at least two straight sides running parallel with the longitudinal axes of the said inner side members, the outer side connecting members having apertures in each end thereof, a pin adapted to extend through one of the apertures in each of the inner and outer side members, a pair of sleeves slidably receivable over the said pin, said sleeves having their outer ends formed to engage the straight sided apertures in the said inner side members, and a yieldable roller bearing member slidably receivable over the said sleeves and extending between the inner side members.

3. A roller bearing chain having a plurality of connecting link members comprising individual link members having inner and outer side connecting members, the inner side connecting members being provided adjacent their ends with apertures having at least two straight sides running parallel with the longitudinal axes of the said inner side members, the outer side members having apertures adjacent each end thereof, a pin adapted to extend through one of the apertures in each of the inner and outer side members a pair of telescoping sleeves, slidably receivable over the pin and one over the other, said sleeves having a shoulder formed on the outer ends thereof for engaging the straight sided aperture in the said inner side members, and a roller extending between the inner side members and slidably receivable upon the said sleeves.

4. A roller bearing drive chain having a plurality of connecting link members comprising individual link members having inner and outer side connecting members, the inner side members being provided with apertures in each end thereof, the said apertures having at least two straight sides running parallel with the longitudinal axes of the said inner side members, the outer side members having apertures in each end thereof, said apertures being at an angle to the plane of the outer side members, a pin adapted to extend through one of the apertures in each of the inner and outer side members, a pair of sleeves having shoulders adjacent their outer ends and being slidably receivable over the said pin the shoulders of which are adapted to engage the apertures of the inner side members, a roller bearing slidably receivable over the said sleeves and extending between the inner side members, whereby the engagement of the pin with the outer angular apertures of the outer side members support the chain link assembly in a slight cross-sectional taper.

5. A roller bearing drive chain having a plurality of connecting link members comprising individual link members having inner and outer side connecting members, said side members being provided with apertures adjacent their ends, the apertures of the side members having at least two straight sides running parallel with the longitudinal axes of the said members a pin extending through one of the apertures in each of the inner and outer side members, a sleeve having shoulders adjacent the outer ends thereof for engaging the straight sided apertures in the inner side members slidably receivable over the pin between the inner side members, a coiled spring roller being slightly longer than the said sleeves and adapted to fit over the said sleeve and be compressed between the inner side members when the link is assembled.

SAMUEL COUPER.

REFERENCES CITED

The following references are of record in the file of this patent:

UNITED STATES PATENTS

| Number | Name | Date |
| --- | --- | --- |
| 664,256 | Gates | Dec. 18, 1900 |
| 1,894,600 | Schmidt | Jan. 17, 1933 |